United States Patent [19]

Keim

[11] 4,065,658
[45] Dec. 27, 1977

[54] ELECTRIC TOASTER CONTROL

[75] Inventor: Robert E. Keim, Bethlehem, Pa.

[73] Assignee: General Electric Company, Bridgeport, Conn.

[21] Appl. No.: 752,629

[22] Filed: Dec. 20, 1976

[51] Int. Cl.² ............................................. F27D 11/02
[52] U.S. Cl. .................................. 219/386; 99/329 R; 99/389; 219/393; 219/408; 219/413; 219/521
[58] Field of Search ............... 219/385, 386, 391, 395, 219/398, 405, 408, 412, 413, 521; 99/329 R, 359, 385, 389, 393, 443 R; 126/107, 335

[56] References Cited

U.S. PATENT DOCUMENTS

| 3,119,000 | 1/1964 | Loch et al. | 219/413 |
| 3,684,860 | 8/1972 | Snyder | 219/413 |
| 3,684,861 | 8/1972 | De Remer | 219/413 |
| 3,752,955 | 8/1973 | Grove | 219/413 |
| 3,845,272 | 10/1974 | Schultz | 219/386 |

*Primary Examiner*—Volodymyr Y. Mayewsky
*Attorney, Agent, or Firm*—Leonard J. Platt; George R. Powers; John F. Cullen

[57] ABSTRACT

An electric oven toaster construction wherein a unique manually operable lever, latch lever, and catch lever are provided for controlling operation of an oven toaster main switch and an oven toaster timer. The manually operable lever is provided with a lug for actuating the latch lever to release the catch lever to stop the operation of the toast timer and open the main switch without opening the oven toaster door. The manually operable lever is also provided with a pin which is uniquely positioned with respect to the catch lever for both operating the catch lever to start operation of the toast timer and being actuated by the catch lever at the end of a toasting cycle for moving the manually operable lever to open the main switch.

8 Claims, 6 Drawing Figures

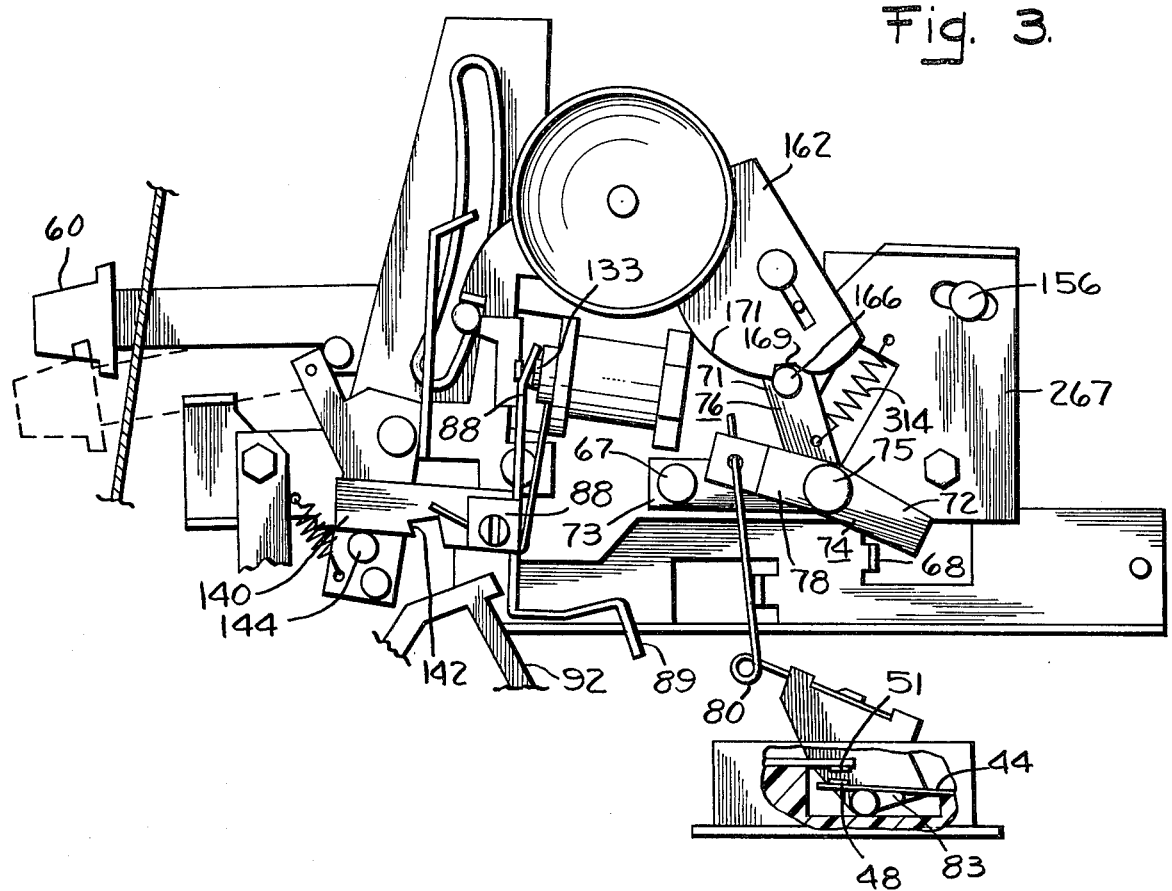
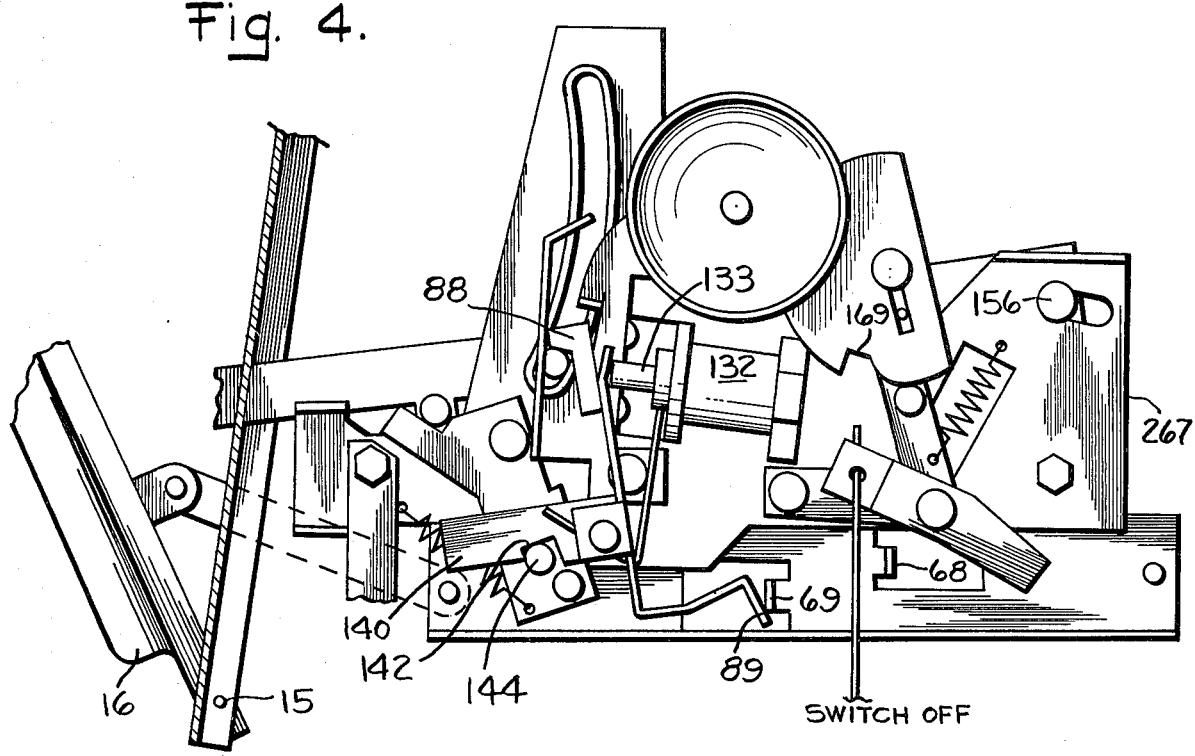

ELECTRIC TOASTER CONTROL

BACKGROUND OF THE INVENTION

This invention relates to an electric oven toaster and more particularly to an improved mechanism for controlling operation of a toast timer switch for energizing or de-energizing oven toaster heating elements.

In a prior U.S. Pat. No. 3,684,861 to Harold A. DeRemer assigned to the same assignee as the present invention there is disclosed an arrangement for controlling operation of an oven toaster. A main switch 40 is provided for controlling energization of heating elements 22, 23, 24 and 25 and a heat up/cool down bimetal toaster timer 82 is provided for actuating a solenoid 132 at the end of a toast cycle to operate a latching mechanism in order to open the main switch to de-energize the electric heating elements. As shown more particularly in FIG. 3 of the patent a manually operable push-button lever 60-154 may be moved downwardly from an off position illustrated in FIG. 3 to a toast position illustrated in FIG. 4 in order to move the main switch 40 to its closed position. During this movement, a cam 162 is rotated in a clockwise direction about its pivot 164 by a drive pin 160 which is fixed to and moves downwardly with the push-button lever 60-154. Rotation of the cam 162 forces a detent lug 166 out of an off notch 169 against the force of a spring 314 to position the detent lug on a raised toast cam surface 167 of the rotatable cam 162. This results in a downward motion of lever 71-73 cause a downward movement of the pivot 75 for lever 72-78. Downward movement of the pivot 75 rotates the lever 72-78 in a counterclockwise direction to move the switch actuator lever 80 downwardly to thereby rotate a cam 83 to close the switch contacts 48, 51 to energize the heating elements to toast a slice of bread.

Downward movement of the lever 154 also starts a toast timer. Downward movement of lever 154 moves its lug 152 into a latch slot 150 of lever 146 to pivot the lever 146 in a counterclockwise direction about pivot pin 148. Counterclockwise movement of lever 146 causes a generally rearward movement of lugs 144 and 206 which are attached to the lower portion of lever 146. Lug 144 cooperates with a latch notch 142 which is formed in a solenoid lever 88-140, and rearward movement of the lug 144 on the lower surface of lever 140 allows the lug 144 to slide rearwardly until it is positioned within the notch 142. At that time further rearward movement is restricted by the rear surface of the notch.

During this rearward movement of the lug 144 on the lower surface of lever 140 a solenoid spring urges the solenoid lever 88-140 in a counterclockwise direction about its pivot 344. Thus, when the pin 144 reaches the notch 142, the entire solenoid lever 88-140 will have been pivoted in a counterclockwise direction against the solenoid spring to move the lug 144 into notch 142. Accordingly, as shown in FIG. 4 the latch notch 142 holds latch lever 146, which in turn holds the lug pin 152 of lever 320, to hold the primary manual setting lever 154 in its downward toast position against the force of a solenoid spring and spring 158 during the entire toasting cycle.

With the parts in the toasting cycle shown in FIG. 4 should it be desired to interrupt the toasting cycle, the door 16 may be opened to open the main switch 48-51. As the door is opened the door carriage 28 is moved forwardly to also move its lug 68 forwardly. The forward movement of lug 68 permits spring 80 to rotate lever 78-72 in a clockwise direction and the spring 80 is released to permit the cam 83 to open the switch contacts 48-51, as illustrated in FIG. 5. Thus, the door 16 may be opened to terminate the toasting cycle and open the main switch contacts 48-51. However, with the parts in position illustrated in FIG. 4 the main switch 40 cannot be opened by simply moving the push-button lever 60-154 upwardly to off since the latch 90 and its notch 150 securely holds the push-button lever 60-154 in the toast position illustrated in FIG. 4.

My invention is concerned with such an oven toaster, and more particularly, to an improved simplified control mechanism which will permit the manual push-button lever 60-154 to be moved upwardly to open the main switch contacts while the door is in its closed position, but is nevertheless correlated to the door so that the main switch is also opened when the door is opened.

SUMMARY OF THE INVENTION

Accordingly it is a particular object of my invention to provide an improved control mechanism for an oven toaster wherein the main switch may be opened for deenergizing the heating elements by either moving a push-button lever, opening a door, or having a toaster timer actuate a main switch to its open position.

It is another object of my invention to provide an improved simplified low cost control mechanism for an electric oven toaster having relatively few parts which may be easily manufactured and assembled to each other.

It is a still further object of this invention to provide a convenient and readily operated manual control which may be moved to an off position without opening a toaster oven door.

In accordance with one of the aspects of this invention, an electric oven toaster includes electric heating means for supplying heat to a toasting chamber, a door for opening and closing the toasting chamber, a switch for energizing and de-energizing the electric heating means and a toast timer for opening a main switch at the end of a toasting cycle to de-energize the electric heating means. The oven toaster also includes a latch lever that is positioned for actuation by the toast timer at the end of the toasting cycle for actuating a mechanism to open the main switch to de-energize the electric heating means. A manually operable lever is provided for closing the main switch and starting the operation of the toast timer. A catch lever is positioned between the manually operable lever and the latch lever for holding the latch lever in a switch closed position to permit energization of the heating means. An actuating means is provided on the manually operable lever for moving the catch lever in one direction when the manually operable lever is moved in one direction for closing the switch, for moving the catch lever into locking engagement with the latch lever to hold the latch lever and the catch lever in a toast timer operating position and the switch in a closed position. The latch lever is uniquely positioned for actuation by a member that is provided on the manually operable lever in order to trip the latch lever when the manually operable lever is manually moved from its toast position to an off position. Movement of the latch lever by the manually operable lever rotates the latch lever to release the catch lever from the latch lever to stop the operation of the toast timer and open the main switch.

With this unique construction, the manually operable lever may be moved upwardly at any time to open the main switch contacts and stop operation of the toast timer while the door is in its closed position. However, the latch lever is still related to the door and the toast timer so that either the door or the toast timer may also actuate the latch lever to stop operation of the toast timer and the main switch. In addition, with this construction, operation of the toast timer may be stopped and the main switch opened by simply operating the same convenient manual control that is used for starting a toast cycle.

Moreover, the additional operational capability of being able to stop the operation of a toast timer and open the main switch without also opening the door is achieved with the use of fewer parts that are present in the control illustrated in U.S. Pat. No. 3,684,861, assigned to the same assignee as the present invention. A lug on the manually operable lever performs the dual function of ringing a bell and actuating a latch lever while a pin on the manually operable lever is utilized for both actuating and being actuated by a catch lever. Although one spring is added between the catch lever and the oven toaster chassis, a spring, a tab, and a rod that were previously required for biasing the manually operable lever upwardly have been eliminated.

Thus, an exceedingly simple, reliable, and readily manufactured oven toaster control has been achieved.

BRIEF DESCRIPTION OF THE DRAWING

Other objects and attendant advantages of the invention will be apparent from the following description taken in connection with the accompanying drawing in which:

FIG. 3 is a fragmentary side elevational view similar to FIG. 2 showing the off position of the parts upon lifting the off push-button or at the termination of a toasting cycle;

FIG. 4 is a fragmentary side elevational view similar to FIG. 2 showing the positions of the parts after the door has been opened;

DESCRIPTION OF THE PREFERRED EMBODIMENT

Figure 1:
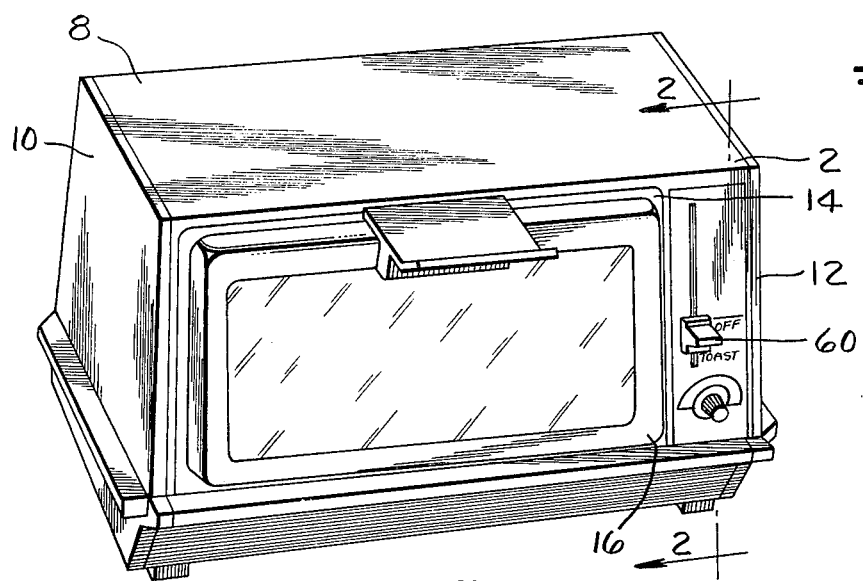
FIG. 1 is a perspective view of an electric oven toaster embodying my improved electric toaster control mechanism.
Figure 2:
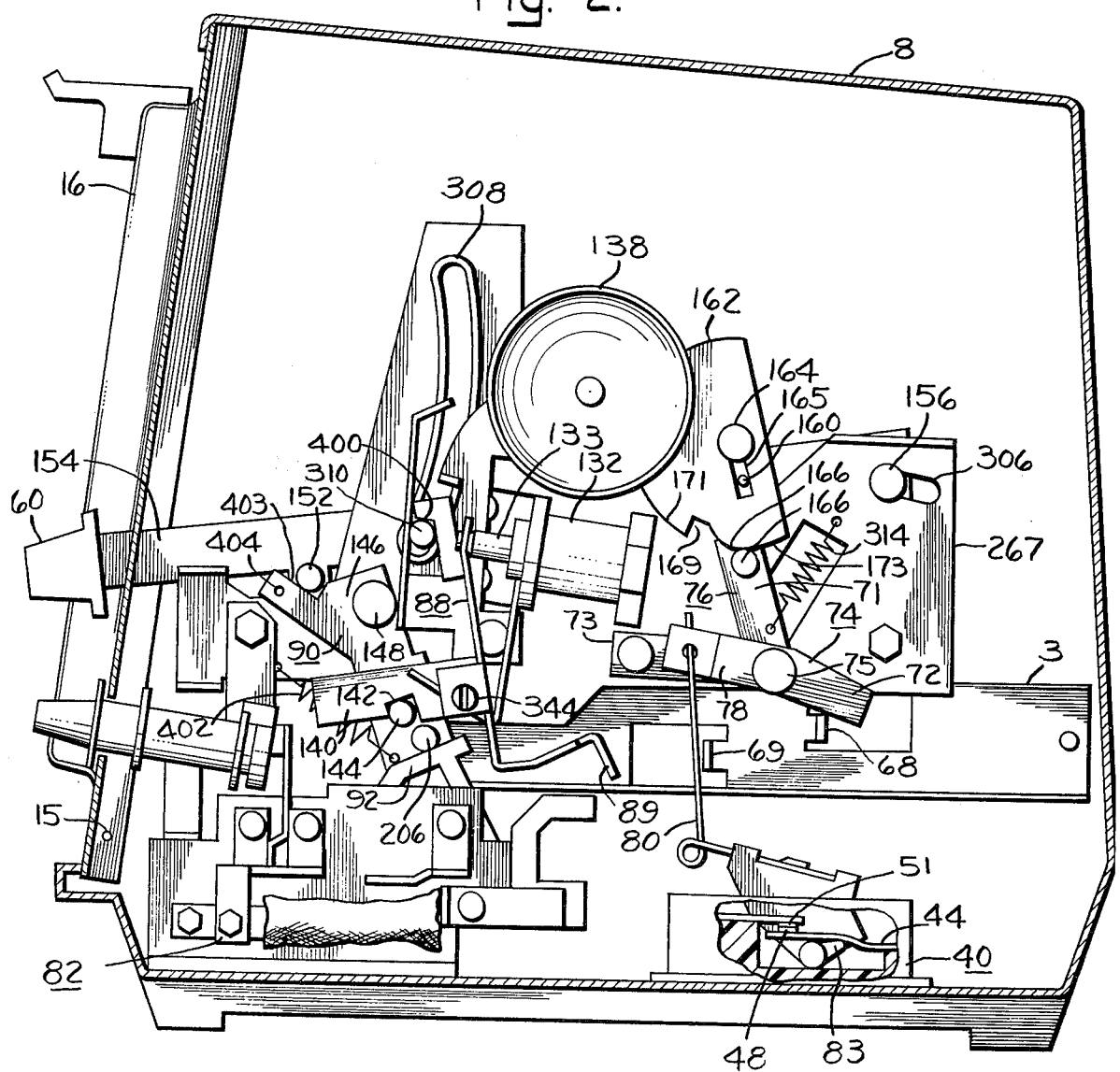
FIG. 2 is a fragmentary side elevational view of a portion of my improved electric toaster control mechanism illustrating the positions of the parts at the commencement of a toasting cycle.

Referring now to the drawing and first particularly to FIGS. 1 and 2 there is shown an electric oven toaster 2 in which is mounted a generally horizontal carriage 3 for supporting a food rack for holding food to be cooked or bread to be toasted. The oven toaster includes a generally horizontal top wall 8, generally parallel vertical side walls 10 and 12 and a front opening 14 to provide access to the inside of the oven toaster. A front door 16 is provided for closing the front opening 14, and as shown in FIGS. 2 and 4 it is pivotally mounted to the lower portion of the oven toaster on pivots 15.

Figure 6:
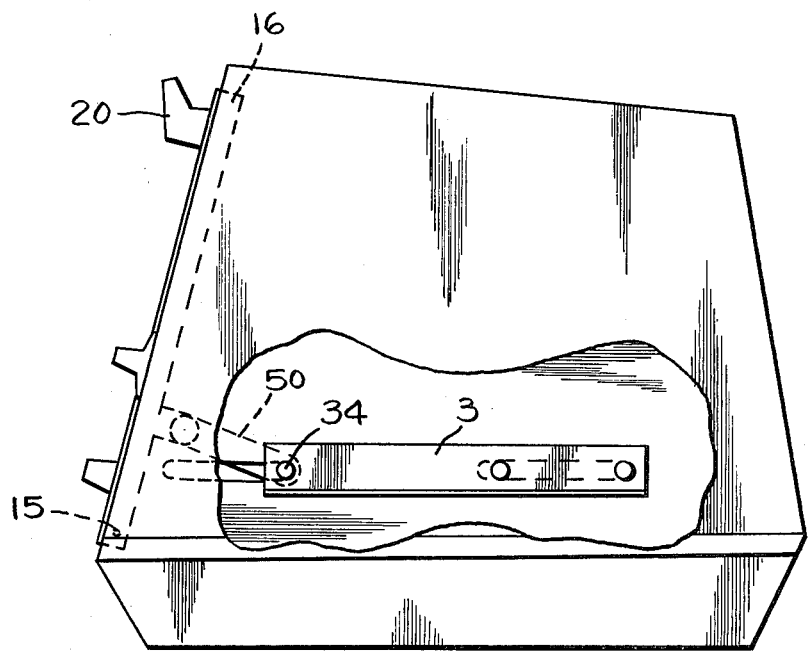
FIG. 6 is a side elevational view of the oven toaster shown in FIG. 1 with portions of the right outside wall broken away to show details of construction.

The front door 16 of the oven toaster is linked to the carriage 3 so that movement of the front door in a door opening direction will result in forward movement of the food rack carriage 3. As shown in FIG. 6, to achieve this, door links 50 are pivoted to the front door 16 and to a forward pin 34 on the carriage 3. Thus, it can be appreciated that when the door is manually opened by pulling on its front handle 20 the door will swing downwardly about its pivots 15 and during this movement the door links 50 will pull outwardly on the pin 34 to slide the carriage 3 and the food rack out of the front opening of the toaster.

Referring now to the circuit diagram illustrated in FIG. 5 it can be seen that the oven toaster includes a main switch 40 for energizing heating elements 22, 23, 24 and 25 and a heat up/cool down bimetal timer 82 for energizing a solenoid 132 to open the main switch 40 in a manner to be more particularly described hereinafter.

Figure 5:
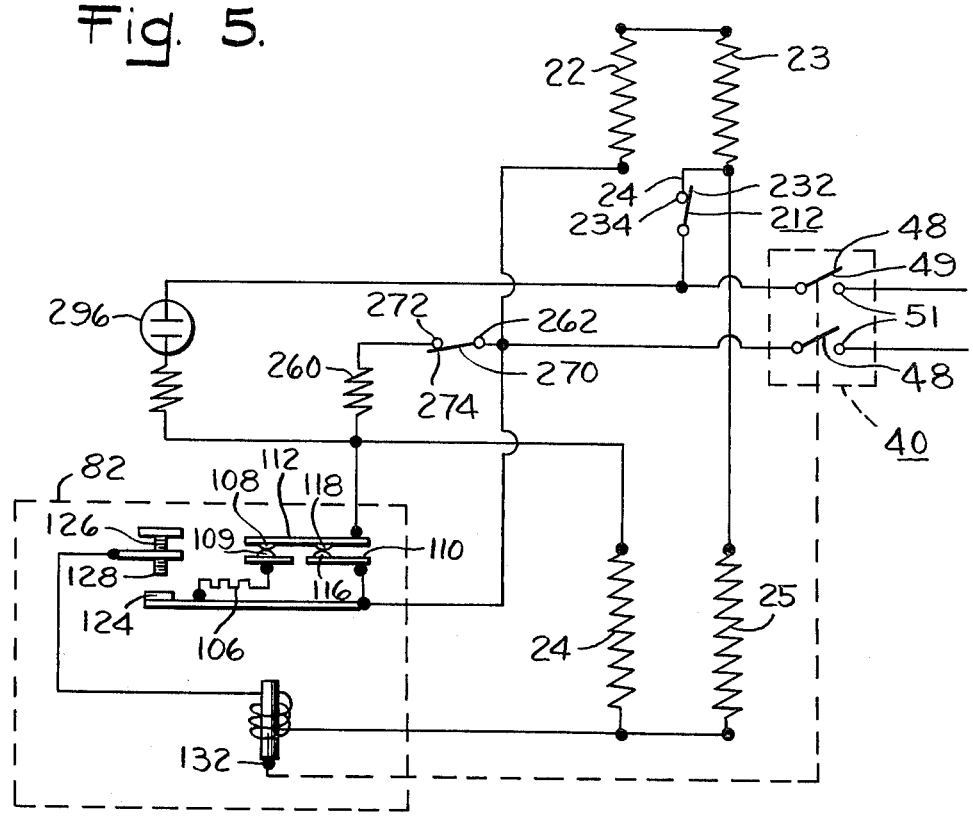
FIG. 5 is a circuit diagram and partial schematic view of portions of the control mechanism for the electric toaster illustrated in FIG. 1.

With particular reference to FIG. 2 and the circuit diagram illustrated in FIG. 5, it can be appreciated that downward movement of a left arm portion 78 of a switch actuating lever 74 will move a spring wire switch actuating lever 80 downwardly to cause a cam member 83 to be rotated to lift switch blades 44 until contacts 48 abut contacts 51 to thereby close the main switch 40.

Heat Up/Cool Down Bimetal Timer

As shown more particularly in FIGS. 2 and 5 the heat up/cool down bimetal timer 82 for timing the toasting cycle is mounted at the forward portion of the oven toaster below carriage 3. While the details of the heat up/cool down bimetal timer do not form a part of my invention and are described and illustrated in greater detail in U.S. Pat. No. 3,529,534 to P. V. Snyder, assigned to the same assignee as the present invention, a brief description of the timer is desirable for an understanding of the instant invention. It should be appreciated that the timer is started by rotating its actuator 92 in a clockwise direction from the position illustrated in FIG. 3 to the position illustrated in FIG. 2. This movement closes a switch 108, 109 to start the heat-up cycle of the heat up/cool down timer.

With particular reference to the circuit diagram illustrated in FIG. 5, it should also be appreciated that at the termination of the cool down cycle of the heat up/cool down bimetal timer switch contacts 124–128 are closed to thereby energize the solenoid 132. Energization of the solenoid 132 pulls the solenoid plunger 133 and the upper portion of a latch lever 88 to the right as shown in FIG. 3. At the same instant a horizontal arm 140 of lever 88 is lifted to release latch notch 142 from catch pin 144 to allow the upper portion 146 of catch lever 90 to be pivoted to the right about its pivot 148 to actuate a mechanism to open the main switch 44.

As shown more particularly in FIGS. 1 and 2, a push-button 60 is provided for controlling the prior art toaster control mechanism as well as my unique simplified control mechanism. A principal element of the control is an elongated push-button lever 154 which extends from the push-button 60 rearwardly to its pivotal connection 156 with a mounting plate 267. As illustrated in FIG. 2 a rivet 156 is fixed to one end of the push-button lever 154 for pivotally mounting the lever at the slot 306. Thus, the rivet 156 which is fixed to the push-button lever 154 can rotate and slide within the pivot slot 306 as the push-button lever is raised and lowered.

In order to smoothly guide the push-button lever 154 as it is rotated within its pivot slot 306, a pin 310 is staked to a central portion of the lever 154 for slidable motion within a vertical slot 308.

The push-button lever 154 operates a mechanism for opening and closing the main switch 40. As shown more particularly in FIGS. 2, 3, and 4 the main switch operating mechanism includes a rotatable cam 162 which is pivotally mounted on the mounting plate 267 by means of a rivet 164.

The cam 162 is generally circular in shape and it includes a slot 165 for receiving a drive pin 160 which is fixed to and extends outwardly from the push-button lever 154. With this construction, it can be appreciated that upward and downward movement of the push-button lever 154 will rotate the cam 162 in a clockwise or counterclockwise direction about its pivot 164. It can be seen that upon upward movement of the push-button lever 154, the pin 160 will abut an upper right surface of the slot 165 to move the cam in a counterclockwise direction. Conversely, downward movement of the push-button lever 154 will cause the drive pin 160 to abut the opposite surface of the slot 165 to cause the cam 162 to be rotated in a clockwise direction.

The cam 162 is provided with an off notch 169 and raised cam surfaces 171 and 173 on opposite sides of the off notch for controlling actuation of the main switch actuating levers 74, 76 and 80. With particular reference to FIG. 3 it can be appreciated that when a detent lug 166 of the switch actuating levers is positioned in the off notch 169, the main switch 40 is in its open position.

With particular reference to FIG. 3 it can also be seen that the main switch operating levers include a lever 76 having a generally vertical arm 71 and a generally horizontal arm 73 that is pivotally mounted at 67 to the support plate 267, and an actuating lever 74 having arms 78 and 72 that is pivotally mounted to the intermediate lever 76 by means of a pivot 75. A spring 314 is positioned between the upper vertical arm 71 of the intermediate lever 76 and the supporting plate 267 for urging the levers upwardly and for holding the detent 166 in the off notch 169 of cam 162.

My simplified control mechanism and the prior art control mechanism illustrated in U.S. Pat. No. 3,654,861, assigned to the same assignee as the instant invention include a latch lever 140 for holding the push-button lever 154 in the toast position illustrated in FIG. 2 with the main switch 40 closed until the heat up/cool down bimetal timer 82 has completed a cycle of operation and the main switch is automatically opened. As shown in FIG. 4, the mechanism includes a latch lever 90 which may be pivotally mounted at 148 to the support plate 267.

The details of the main switch, the heat up/cool down bimetal timer, and the overall construction of the push-button lever 154 and a further description of the levers and linkages thus far described are described and illustrated in greater detail in U.S. Pat. No. 3,684,861 by P. V. Snyder, assigned to the same assignee as the present invention.

Simplified Control And Manual Off Mechanism

In accordance with my invention the levers for holding the manually operable push-button lever 154 in its off position illustrated in FIG. 2 have been modified to permit the push-button 60 and the lever 154 to be manually lifted upwardly to interrupt or stop the operation of the heat up/cool down bimetal timer and open the main switch contacts without requiring the opening of door 16. As illustrated more particularly in FIG. 2, the upper portion of the latch lever 88 has been modified to include a cam surface 400 for cooperating with the previously described lug 310 that is fixed to the push-button lever 154. With this construction, it can also be seen that a spring 402 has been provided for urging the catch lever 90 in a clockwise direction about its pivot 148 for urging the lever and particularly its catch 144 away from the notch 142 in the latch lever 88. With particular reference to FIG. 3, it can also be appreciated that the mechanism does not include a spring for urging the push-button lever 154 upwardly nor does it include a latch notch for restraining upward movement of the pin 152 of the push-button lever.

With this unique construction, it can be appreciated that the main switch 40 may be opened and the toaster timer cycle may be interrupted by simply lifting the manually operated push-button lever 60-154 upwardly without having to open the door 16. During such movement, the lug 310 on the push-button lever 154 slides in slot 308 and slides on the cam surface 400 of the latch lever 88 to rotate the latch lever counterclockwise about its pivot 344 to lift the lower arm 140 of the latch lever to thereby release the catch pin 144 from the latch notch 142 of the latch lever. As soon as the pin 144 is released from the notch 142, the spring 402 moves the catch lever 90 in a clockwise direction about its pivot 148 to move the upper leg portion 404 of the catch lever to the right. As the push-button lever 154 is raised it can be appreciated that pin 165 will rotate cam 162 to position pin 166 of the main switch actuating lever 76 in the off notch 169 of the cam 162. Naturally, as the pin 166 moves into the off notch 169, the levers 76 and 74 are lifted upwardly along with the spring lever 80 to open the switch contacts 48, 51 as illustrated in FIG. 3.

It can also be appreciated that with this unique simplified construction the manually operable push-button lever 60-154 will be lifted to its off position at the end of a toasting cycle although the spring 158, plunger 334 and tab 338 shown and described in the prior U.S. Pat. No. 3,684,861 assigned to the same assignee as the present invention, have been eliminated from my simplified construction. At the end of a toasting cycle, the toast timer 82 actuates its solenoid 132 to rotate the latch lever 88 counterclockwise about its pivot 344 to lift the lower arm 140 of the latch lever to thereby release the catch pin 144 from the latch notch 142 of the latch lever. As the pin 144 is released from the notch 142, the spring 402 moves the catch lever 90 in a clockwise direction about its pivot 148 to move the upper leg portion 404 of the catch lever to the right. During this movement, the spring 402 also moves the upper cam surface 403 of the catch lever 90 to the right to slide the pin 152 of the push-button lever upwardly to raise the pushbutton lever 154 far enough to open the main switch. As the push-button lever 154 is raised it can be appreciated that the pin 165 will rotate cam 162 to position pin 166 of the main switch actuating lever 76 in the off notch 169 of the cam 162 to open the main switch.

It can also be appreciated that my simplified arrangement does not interfere with opening or closing of the door and the mechanism is interrelated with the door so that the main switch is opened and operation of the toast timer is stopped when the door is opened. With particular reference to FIGS. 1 and 4, it can be seen that as the door 16 is opened, a tab 68 on the carriage 3 will be moved forwardly to release the right arm 72 of lever 74 to permit spring arm 80 to open the main switch contacts 51-48. As shown in FIG. 4, another tab 69 on the carriage 3 is moved against a lower arm 89 of the latch lever 88 to pivot the latch lever about its pivot 344 to thereby release the catch pin 144 from the latch notch 142 of the latch lever. As soon as the pin 144 is released from the notch 142, the spring 402 moves the catch lever 90 in a clockwise direction about its pivot 148 to move the upper leg portion 404 of the catch lever to the right. This movement lifts pin 152 of the push-button lever 60-154 to raise the push-button lever 154 far enough to open the main switch 40.

Further comparing my simplified control mechanism with the prior art mechanism described in U.S. Pat. No. 3,684,861, assigned to the same assignee as the present invention, it can be appreciated that the upper portion 404 of the catch lever 90 does not function as a latch to prevent the lever 154 from being lifted upwardly to its off position and that pin 152 does not function as a latch pin but as an actuating pin for moving the catch lever 90 in a counterclockwise direction about its pivot 148 or as an actuated pin for permitting the cam surface 403 of the catch lever to lift the push-button lever 154 upwardly under the force of spring 402. It can also be appreciated that the solenoid latch lever 88 has been shaped to include a cam surface that may be actuated by a lug 310 that is provided on the manually operable push-button lever 154 for stopping operation of the toaster timer when the push-button lever 154 is lifted from its toast position to its off position. Thus, with my unique construction the lug 310 functions to not only sound a bell 138 at the end of a toasting cycle but also functions to cooperate with the latch lever 88 to stop the toasting cycle when the push-button lever 154 is lifted from its toast position to its off position.

From the foregoing description, it will be appreciated that my improved mechanism for controlling operation of the toast timer switch 40, which has the additional operational capability of manually stopping or interrupting operation of the toast timer and the main switch by simply lifting the push-button 60 upwardly to its off position, is achieved with the use of fewer parts than the control mechanism of U.S. Pat. No. 3,684,861, assigned to the same assignee as the present invention. Plunger 334, tab 338 and spring 158 have been eliminated while a low cost spring 402 has been added for lifting the push-button lever 154 and rotating the catch lever 90 when the catch 144 has been released from latch lever 88. The cam surface 400 on the latch lever 88 may be provided at the same time that other portions of the latch lever 88 are being formed. Thus, an exceedingly simple and reliable mechanism is achieved with the use of relatively few parts.

What I claim is:

1. In an electric oven toaster wherein electric heating means supplies heat to a toasting chamber, a door is mounted on the oven toaster, a switch is provided for energizing and de-energizing the electric heating means, a toast timer is provided for opening the switch to de-energize the heating means at the end of a toasting cycle, a latch lever is positioned for operation by the toast timer and the door for opening the switch to de-energize the heating elements, and a manually operable lever is provided for closing the switch and starting the operation of said toast timer the improvement comprising:
   a. a catch lever positioned between the manually operable lever and the latch lever for holding the latch lever in latched engagement therewith when the switch has been moved to its closed position for energizing the heating means;
   b. means provided on said manually operable lever for moving the catch lever in one direction when the manually operable lever is moved in one direction for closing the switch for moving the catch lever into locking engagement with the latch lever to hold the latch lever and the catch lever in a toast timer operating position and the switch in a closed position; and
   c. means on said manually operable lever for moving the latch lever to release the catch lever from the latch lever to stop the operation of said toast timer and open the switch upon manual movement of said manually operable lever.

2. An electric oven toaster construction as defined in claim 1 wherein spring means is provided for urging said catch lever in one direction to stop operation of said toast timer and to hold the catch lever out of locking engagement with the latch lever.

3. An electric oven toaster construction as defined in claim 2 wherein the latch lever includes an arm having a cam surface that is positioned for operation by a lug on the manually operable lever for permitting the lug to move the latch lever to release the catch lever from the latch lever to stop the operation of the toast timer when the manually operable lever is moved in another direction for opening the switch.

4. An electric oven toaster construction as defined in claim 3 wherein the catch lever is pivotally mounted in a generally vertical position on said oven toaster and includes an upwardly extending non-latching cam surface that is positioned for actuation by a pin on said manually operable lever when the manually operable lever is moved in said one direction for closing the switch and for moving the catch lever into locking engagement with the latch lever against the force of the spring that is connected to the catch lever.

5. In an electric oven toaster wherein electric heating means supplies heat to a toasting chamber, a door is mounted on the oven toaster, a switch is provided for energizing electric heating means, a toast timer including a solenoid is provided for opening the switch to de-energize the heating means, and a latch lever is positioned for operation by the solenoid of the toast timer and the door for opening the switch to de-energize the heating elements, the improvement comprising:
   a. a freely movable manually operable lever unbiased by spring means for closing the switch and starting the operation of said toast timer;
   b. a catch lever having means formed thereon for holding the latch lever in latched engagement therewith when the switch has been moved to its closed position for energizing the heating means;
   c. means provided on said manually operable lever for moving the catch lever in one direction when the manually operable lever is moved in one direction for closing the switch for moving the catch lever into locking engagement with the latch lever to hold the latch lever and the catch lever in a toast timer operating position and the switch in a closed position; and d. means on said manually operable lever for moving the latch lever to release the catch lever from the latch lever to stop the operation of said toast timer when the manually operable lever is moved in another direction for opening the switch.

6. An electric oven toaster construction as defined in claim 5 wherein spring means is provided for urging said catch lever in one direction to stop operation of said toast timer and to hold the catch lever out of locking engagement with the latch lever.

7. An electric oven toaster construction as defined in claim 5 wherein the latch lever includes an arm having a cam surface that is positioned for operation by a lug on the manually operable lever for permitting the lug to move the latch lever to release the catch lever from the latch lever to stop the operation of the toast timer when the manually operable lever is moved in another direction for opening the switch.

8. An electric oven toaster as defined in claim 7 wherein the solenoid is provided with a plunger that is connected to the latch lever adjacent to the cam surface of the latch lever that is arranged for actuation by the lug on the manually operable lever.

* * * * *